Oct. 9, 1928.
R. J. ALTGELT
1,686,546
CULTIVATOR
Filed June 8, 1926
4 Sheets-Sheet 1
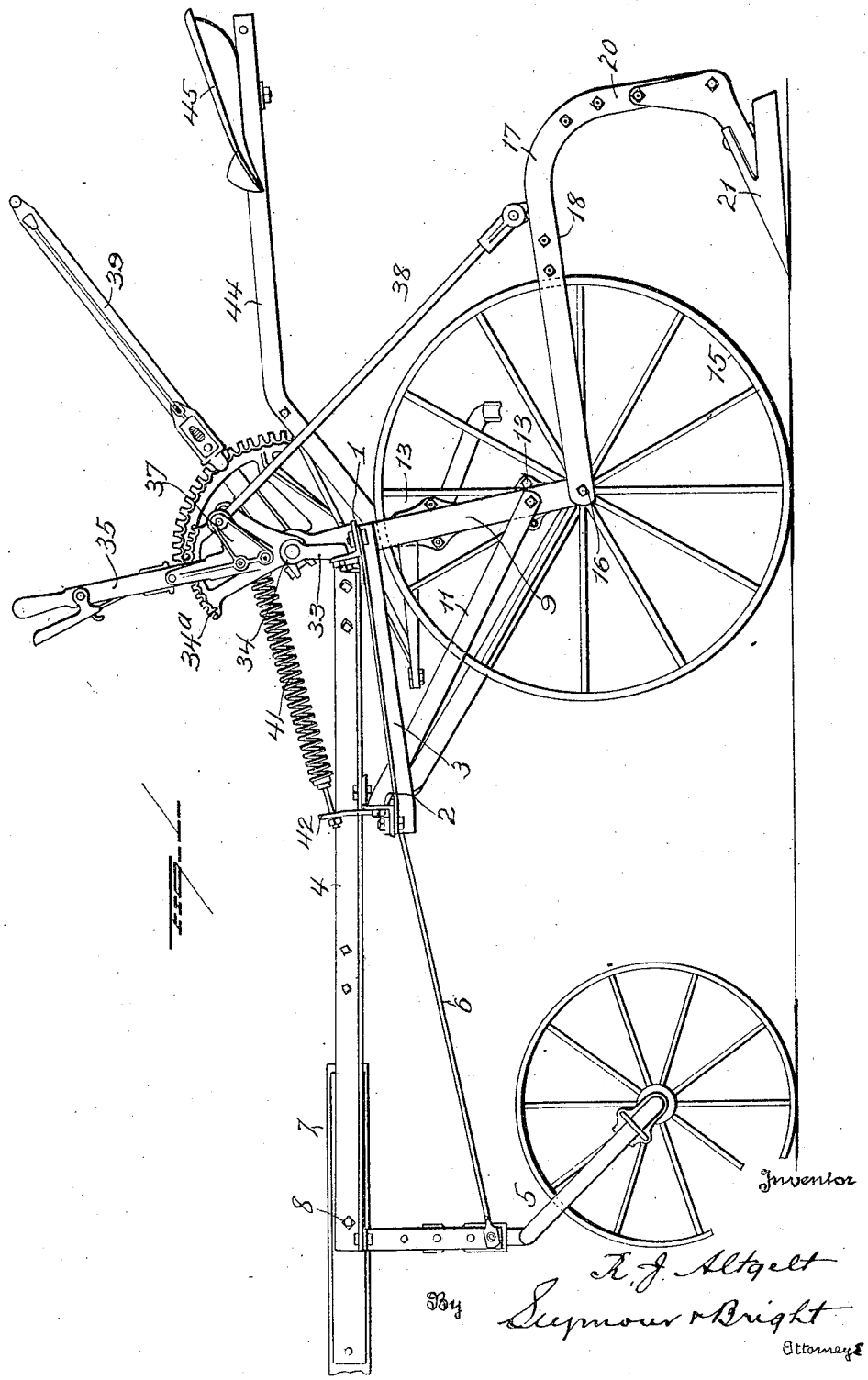

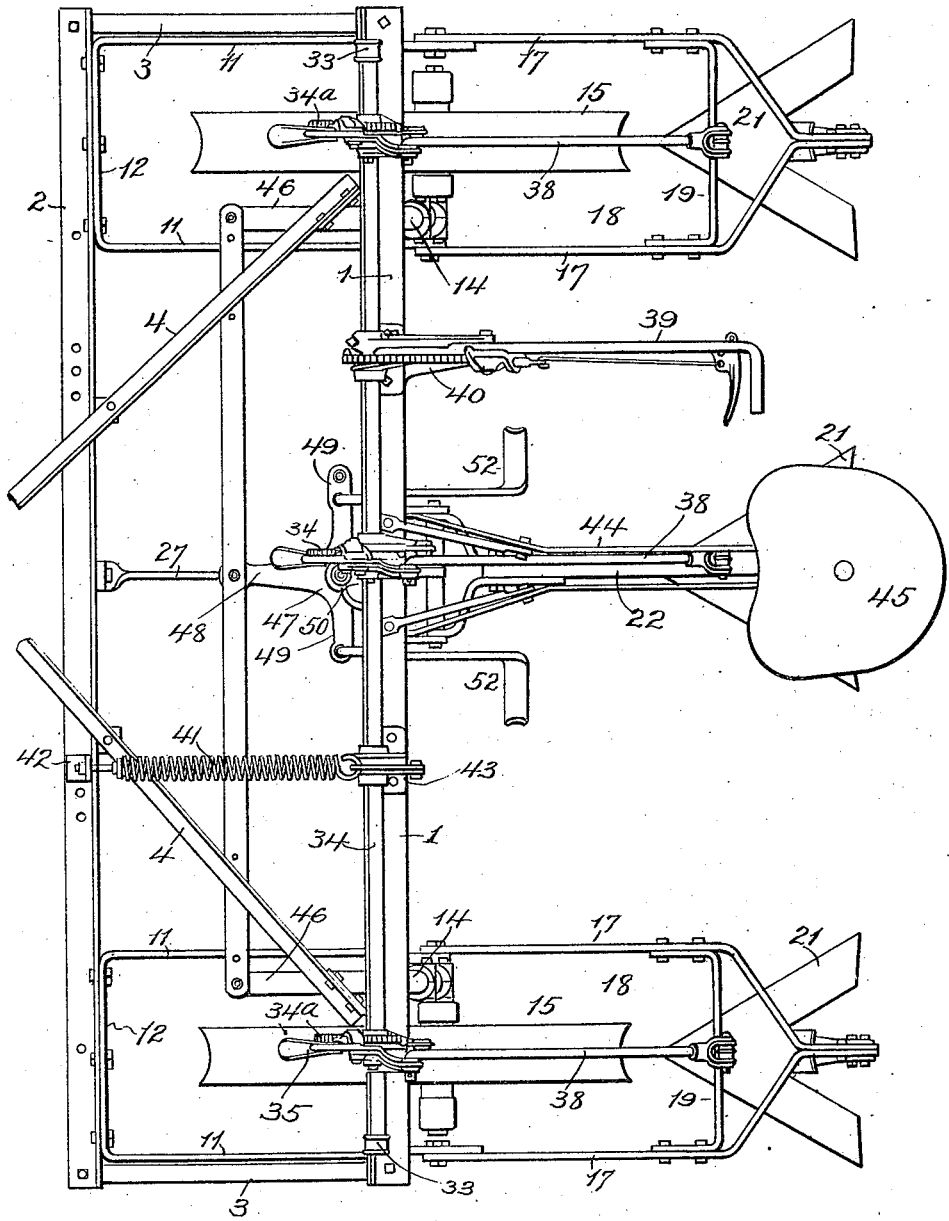

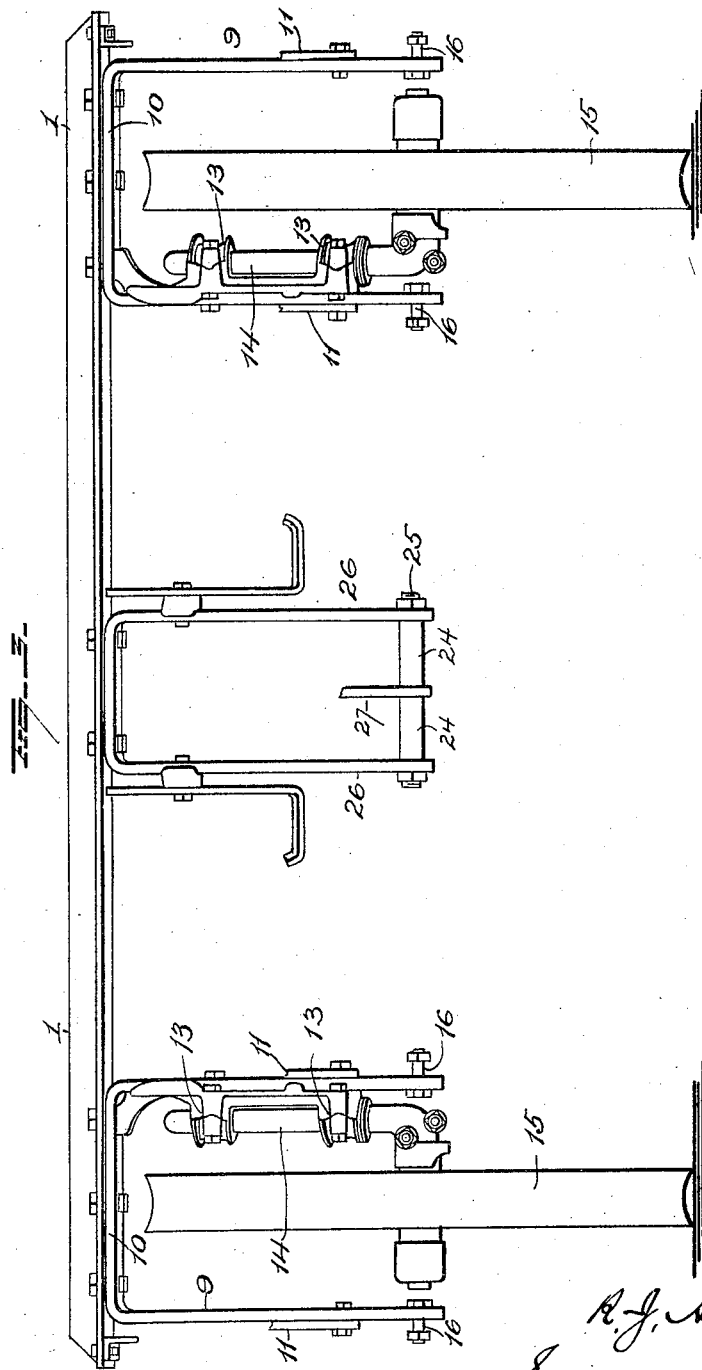

Oct. 9, 1928.
R. J. ALTGELT
1,686,546
CULTIVATOR
Filed June 8, 1926    4 Sheets-Sheet 4
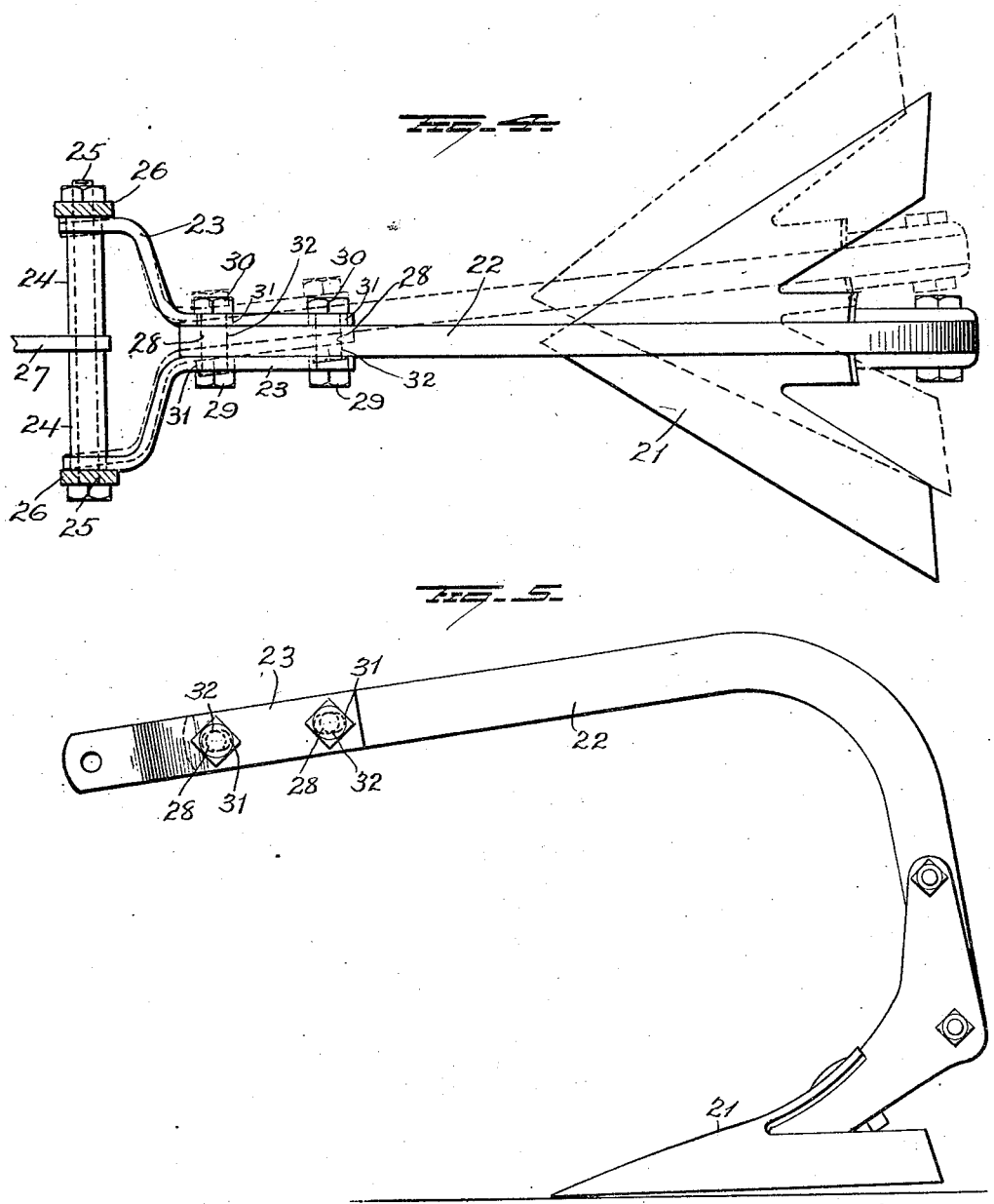

Patented Oct. 9, 1928.

1,686,546

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

CULTIVATOR.

Application filed June 8, 1926. Serial No. 114,461.

This invention relates to improvements in cultivators,—one object of the invention being to provide a construction in which the beams for the soil engaging members may be made short and thus not only economize in the amount of material composing the beams, but also enhance the strength and stiffness of the same.

A further object is to so construct a cultivator that the forward portions of the members of two-part beams shall be made to embrace the carrying wheels and connect with the framework at points within the radii of the wheels.

A further object is to so construct a cultivator that the beams which carry the soil-engaging members shall be connected with the framework approximately in horizontal alinement with the axes of the wheels.

A further object is to provide, in a three row cultivator, means whereby the central beam and the soil-engaging member carried thereby may be adjusted laterally to adapt the cultivator to rows which may not be spaced equi-distant apart.

With these and other objects in view, the invention consists in certain novel features of construction and combinations of parts as hereinafter set forth and pointed out in the claims.

In the accompanying drawings;

Figure 1 is a view in side elevation of a cultivator embodying my improvements;

Figure 2 is a plan view;

Figure 3 is a rear view of the rear frame assembly, and

Figures 4 and 5 are separate views showing the center beam and connections.

The framework of the cultivator includes rear and front transverse angle iron frame bars or beams 1 and 2 which are connected at their ends by side bars 3. Diagonally disposed frame bars 4 are rigidly connected with the parallel bars or beams and converge beyond the front frame bar 2. A front truck or carriage 5 is located at the forward end of the forwardly projecting frame formed by the converging bars 4 and serves to support the forward end of the cultivator, said truck or carriage being suitably braced as indicated at 6. The rear portion of pole 7 is disposed between the forward portions of the converging bars 4 and has hinge or pivot connection therewith as indicated at 8 to permit vertical swinging movement of said pole.

Inverted U-shaped supports or yokes 9 depend from end portions of the rear transverse frame bar 1 and have their upper horizontal members 10 rigidly bolted to said frame bar 1, said yokes being braced by U-shaped braces 11 having their parallel arms secured to the parallel arms of the yokes 9 and their connecting members 12 securely bolted to the front transverse frame bar 2. Brackets 13 are secured to one depending arm of each supporting yoke 9 and provide bearings for the vertical portions 14 of axles which pass through the hubs of carrying wheels 15,—said wheels being thus so located that they will be partially embraced by the supporting yokes 9.

Near the lower ends of the depending arms of each supporting yoke 9, shoulder bolts 16 are located, and to these bolts the forward ends of the members 17, 17 of a split or two-part cultivator beam 18 are connected, so that each of said beams 18 is connected with the framework in horizontal alinement with the axis of a carrying wheel and straddles the latter. The members 17 of each cultivator beam 18 are connected rearwardly of the carrying wheel, by a transverse brace 19, and in rear of said brace, the beam members are made to converge and merge into parallel rear portions which are bent downwardly to form a standard 20, with which a cultivator soil-engaging member 21 is connected. While I have shown and described the connection of the two side beams 18 with the framework as being in alinement with the axes of the carrying wheels 15, such connections might be out of such alinement but within the radii of said wheels. By providing for connection of the cultivator beams with the framework within the radii of the wheels, preferably in alignment with the axes of the wheels, I am enabled to employ short beams and thus not only economize material but insure the strength and rigidity of the beams.

The center cultivator beam is indicated at 22 and carries a cultivator soil-engaging member 21. Arms 23 are secured to the forward portion of the beam 22 and extend laterally and then forwardly therefrom, the forward ends of said arms being mounted on sleeves 24 encircling a bolt 25 which passes through the arms of a supporting yoke 26. This yoke is approximately U-shaped and its connecting member is securely bolted to the rear transverse frame bar 1. A brace 27 is attached at its rear end to the bolt 25 and kept central between the arms 23, by the sleeves 24, and the forward end of said brace is attached to the front transverse frame bar (see Figs. 3 and 4). The means for securing the arms 23 to the beam 22 are bolts 28 having heads 29 at one end and nuts 30 on the other end. The bolts 28 pass through elongated holes 31 in the arms 23 and through round holes 32 in the beam. With such construction, the central beam 22 may be adjusted laterally (after having loosened the nuts 30) so as to adapt the cultivator to rows which may not be spaced equi-distant apart.

Brackets 33 are secured to the rear transverse frame bar 1, near respective ends thereof and provide bearings for the rounded end portions of a shaft 34. This shaft is preferably made angular in cross section, and secured rigidly thereto are toothed segments 34ª corresponding in number with the cultivator beams. An auxiliary lever is pivotally connected with each segment 34ª and carries a suitable manually operable detent for cooperation with the teeth of the segment. Each lever 35 is provided with a crank arm 37 with which one end of a rod 38 is connected, the other end of said rod being connected with one of the cultivator beams. The lower rear ends of the rods for the cultivator beams 18 are connected with the central portions of the braces 19 which connect the members 17, 17 of said beams and the rod 38 for the central beam is connected with the latter over its longitudinal axis. It will be observed that the lever rods 38 are connected with the longitudinal central portions of the cultivator beams practically directly behind the wheels. The pressure rods 38, therefore, exert central pressure on the soil-engaging elements carried by said beams. This construction is particularly valuable when split or two-part beams are employed, as the proper and even penetration of the ground by the soil-engaging elements will be insured.

A main lever 39 is secured to the shaft 34 and is provided with a suitable manually operable detent to cooperate with the teeth of a segment 40 secured to the rear frame bar 1. It is apparent that when the auxiliary levers 35 are locked to their segments and the main lever 39 is operated, all of the cultivator beams may be raised or lowered simultaneously. A spring 41 may be employed to assist the beam lifting operation, one end of said spring being secured to a bracket 42 secured to the front frame beam 2 and the other end being secured to an arm 43 secured to the shaft 34.

A support 44 for a seat 45 is attached to the frame of the cultivator and projects rearwardly therefrom, the seat 45 being located over the soil-engaging member 21 carried by the central beam 22.

The axles 14 are provided at their upper ends with forwardly projecting arms 46, and a lever 47 having a forwardly projecting arm 48 and laterally projecting arms 49, is pivotally supported by a bracket 50 secured to the rear frame bar 1. The axle arms 46 and the arm 48 of the lever 47 are connected by a rod or bar 51 pivotally attached thereto. Pedal levers 52 are connected with the arms 49 of the lever 47 for operating said lever to transmit motion, through the rod or bar 50 and axle arms 46 for turning the axles to shift the wheels for guiding purposes.

Having fully described my invention what I claim as new and desire to secure by Letters-Patent, is:—

1. In an agricultural implement, the combination with a horizontal frame, of depending pairs of fixed supports, wheels disposed between the depending supports of the respective pairs of supports, axles for said wheels, each mounted on one of the supports to rock thereon about a vertical axis, beams connected with said depending supports, and soil-engaging means carried by said beams.

2. In an agricultural implement, the combination with a horizontal frame, of fixed yokes depending from said frame, axles each mounted on a side member of a yoke for rocking movement about an axis parallel with said member, wheels disposed in said yokes, beams connected with said yokes, and soil-engaging means carried by said beams.

3. In an agricultural implement, the combination with a horizontal frame, a pair of fixed supports depending from said frame, a wheel disposed between the depending supports and carried by one of them, a two part beam having its respective parts connected with the respective depending supports, and soil-engaging means carried by said two-part beam.

4. In an agricultural implement, the combination with a horizontal frame including front and rear frame bars, of supporting yokes secured rigidly to and depending from the rear frame bar, U-shaped braces connecting the arms of said yokes with the front frame bar, wheels disposed in said depending yokes, axles for said wheels each carried by one arm of one of the yokes, two-part beams, each having its respective parts connected with the respective arms of one of said depending yokes, and soil engaging means carried by each of the two-part beams.

5. In an agricultural implement, the combination with a wheeled frame, a beam connected therewith, and a manually operable lever mounted on the frame over the wheel, of a rod connected at one end with said lever and at the other end with said beam rearwardly and in the vertical plane of a wheel of the wheeled frame.

6. In an agricultural implement, the combination with a frame and wheels therefor, of a two-part beam straddling each wheel and connected with the frame at respective sides of the wheel, manually operable levers mounted on the frame over the respective wheels, and connections between said levers and said beams, the attachment of the respective connections with the beams being in line with the longitudinal centers thereof and in rear of the wheels.

7. In an agricultural implement, the combination with a frame, and a carrying wheel, of a two-part cultivator beam having its parts straddling the carrying wheel and connected with the frame at respective sides of said carrying wheel, soil-engaging means carried by said beam, a transverse brace between the parts of the beam, a manually operable lever on the frame over the wheel, and a connection between said lever and the central portion of the brace which connects the parts of the beam.

8. In an agricultural implement, the combination with a wheeled frame, a plurality of beams including two relatively fixed side beams and an intermediate beam, and soil-engaging means carried by said beams, of means whereby the intermediate beam may be adjusted laterally to be set nearer one of the side beams.

9. In an agricultural implement, the combination with a wheeled frame, a plurality of beams including relatively fixed side beams and an intermediate beam, and soil-engaging means carried by said beams, of arms connecting the intermediate beam with the frame, said arms having rocking engagement with the frame and adjustable connection with the intermediate beam whereby the latter may be adjusted laterally relatively to the side beams.

10. In an agricultural implement, the combination with a wheeled frame, a plurality of beams including side beams and an intermediate beam, and soil-engaging means carried by said beams, of arms connecting the intermediate beam with the frame, said arms having adjustable connection with the intermediate beam whereby the latter may be adjusted laterally relatively to the side beams, said adjustable connection comprising elongated holes in said arm, round holes in the beam, bolts passing through said holes, and means for tightening and loosening connection of said bolts with the arms and beam.

11. In an agricultural implement, the combination with a wheeled frame, a plurality of beams including side beams and an intermediate beam, and soil-engaging means carried by said beams, of a supporting yoke secured to an intermediate portion of the frame, a member connecting the arms of said yoke, a brace connected with said member, sleeves on said member between the brace and arms of the yoke, and arms between said sleeves and the arms of the yoke and adjustably secured to the intermediate beam, whereby the intermediate beam may be adjusted laterally with respect to the side beams.

In testimony whereof, I have signed this specification.

RUDOLPH J. ALTGELT.